United States Patent [19]

Hayakawa et al.

[11] 4,289,746

[45] Sep. 15, 1981

[54] PROCESS FOR PREPARATION OF MICACEOUS IRON OXIDE

[75] Inventors: Masanori Hayakawa; Satoshi Nishimura, both of Ube, Japan

[73] Assignee: Central Glass Company, Limited, Ube, Japan

[21] Appl. No.: 151,538

[22] Filed: May 19, 1980

[30] Foreign Application Priority Data

| May 22, 1979 [JP] | Japan | 54/62219 |
|---|---|---|
| May 22, 1979 [JP] | Japan | 54/62220 |
| May 22, 1979 [JP] | Japan | 54/62221 |
| May 22, 1979 [JP] | Japan | 54/62222 |

[51] Int. Cl.³ .............................................. C01G 49/06
[52] U.S. Cl. .................................... 423/633; 423/632; 106/304
[58] Field of Search ................. 423/633, 632; 106/304

[56] References Cited

U.S. PATENT DOCUMENTS

| T867,010 | 10/1969 | Pearlman | 423/633 |
|---|---|---|---|
| 2,705,188 | 3/1955 | Swaney | 423/633 |
| 3,987,156 | 10/1976 | Nobuoka | 423/633 |

FOREIGN PATENT DOCUMENTS

| 44-668 | 1/1969 | Japan | 423/633 |
|---|---|---|---|
| 48-29718 | 9/1973 | Japan | 423/633 |

*Primary Examiner*—Jack Cooper
*Attorney, Agent, or Firm*—Lowe, King, Price & Becker

[57] ABSTRACT

High purity hexagonal plate-like $\alpha$-$Fe_2O_3$, commonly called micaceous iron oxide, is prepared by a hydrothermal treatment of either magnetite or an iron ore, or an iron oxide, of which principal component is magnetite together with an oxidizer in an aqueous alkali solution. Main advantage of this process is a great decrease in the consumption of alkali. Pure magnetite for use in this process can be prepared economically by a hydrothermal treatment of an iron ore, or an oxide, of which principal component is an oxide of trivalent iron in an aqueous alkali solution together with a compound of divalent iron and/or metallic iron.

22 Claims, 5 Drawing Figures

PROCESS FOR PREPARATION OF MICACEOUS IRON OXIDE

BACKGROUND OF THE INVENTION

This invention relates to a process for the preparation of hexagonal plate-like $\alpha$-$Fe_2O_3$, a material commonly called Micaceous Iron Oxide and abbreviated to MIO, which is of use as an important material for paints and high grade ferrites.

Typical examples of known processes for the preparation of MIO are described in Japanese Patent Applications Publication Nos. 43(1968)-12435 and 48(1973)-29718. In these processes usually ferrous sulfate formed as a by-product in the preparation of titanium oxide, or ferrous sulfate or ferrous chloride resulting from pickling of steel is utilized as the starting material, and MIO is prepared by first oxidizing the employed iron salt by using an oxidizer such as nitric acid or a chlorate and, after neutralization, performing a hydrothermal treatment in an aqueous alkali solution. These processes have attracted attention because of the possibility of preparing MIO from abundantly wasted iron salts which are liable to become origins of environmental pollution, but from an economical viewpoint these processes cannot be asserted to be very profitable because the most expensive material among the raw materials for the preparation of MIO is alkali, not iron source.

SUMMARY OF THE INVENTION

It is an object of the present invention to provide a novel process for the preparation of MIO of sufficiently high purity, which process permits the use of a cheap iron source and requires only a very small quantity of alkali compared with conventional processes and, hence, can be performed at a greatly reduced cost.

We have made intensive and extensive studies for a process of inexpensively preparing high purity MIO and discovered that high purity MIO can be obtained by a hydrothermal treatment of magnetite together with an oxidizer in a heated alkali solution. This method is markedly economical because of the smallness of the quantity of required alkali. Furthermore, we have confirmed that an almost similar result can be achieved even by using a crude iron oxide of which principal component is magnetite in place of pure magnetite. The present invention has been completed based on such discovery.

According to the invention, micaceous iron oxide, i.e. hexagonal plate-like $\alpha$-$Fe_2O_3$, is prepared by subjecting an iron oxide of which principal component is magnetite to a hydrothermal treatment together with an oxidizer in an aqueous alkali solution.

Examles of crude iron oxides useful as the starting material in the process according to the invention are iron ores, ferrites and mill scale. The use of pure magnetite is somewhat advantageous from the viewpoint of purity of the obtained MIO.

Examples of oxidizers for use in the process of the present invention are chlorates, nitrates, perchlorates, hydrogen peroxide, air and oxygen.

The hydrothermal treatment in this process is performed at a temperature in the range from about 100° C. to about 400° C., and more preferably in the range from about 120° C. to about 300° C., usually in an autoclave. Sodium hydroxide or potassium hydroxide is a suitable alkali. The alkali concentration of the aqueous alkali solution is made to fall within the range of 1 to 20 N as NaOH, and more preferably in the range of 2 to 15 N as NaOH.

It is suitable that the mole ratio of the oxidizer to magnetite in the starting material is, when the oxidizer is sodium chlorate by way of preferred example, in the range from 0.16 to 0.8 and more preferably in the range from 0.2 to 0.6.

The process according to the present invention has the following advantages.

(1) It is possible to utilize a cheap material as the iron source.

(2) It is easy to control the particle size of the prepared MIO by varying the reaction condition.

(3) It suffices to use a considerably small quantity of alkali compared with alkali quantities required in conventional processes for the preparation of MIO. Therefore, the alkali solution is low in viscosity, and for this reason it is possible to increase the concentration of the slurry subject to the hydrothermal treatment, meaning that the process can be performed with a high volumetric efficiency.

(4) It is possible to obtain MIO high in purity.

In the course of our studies mentioned hereinbefore, additionally we have discovered that magnetite for use in the preparation of MIO according to the invention can be prepared economically by mixing an iron ore, or an iron compound, of which principal component is an oxide of trivalent iron with a compound of divalent iron and/or a zero valence iron (metallic iron) and subjecting the resultant mixture to a hydrothermal treatment in an aqueous alkali solution. When this process is employed, it is possible to reuse the alkaline mother liquor left after preparation of magnetite for the hydrothermal treatment in the processs of preparing MIO.

DESCRIPTION OF THE PREFERRED EMBODIMENTS

Figure 1:
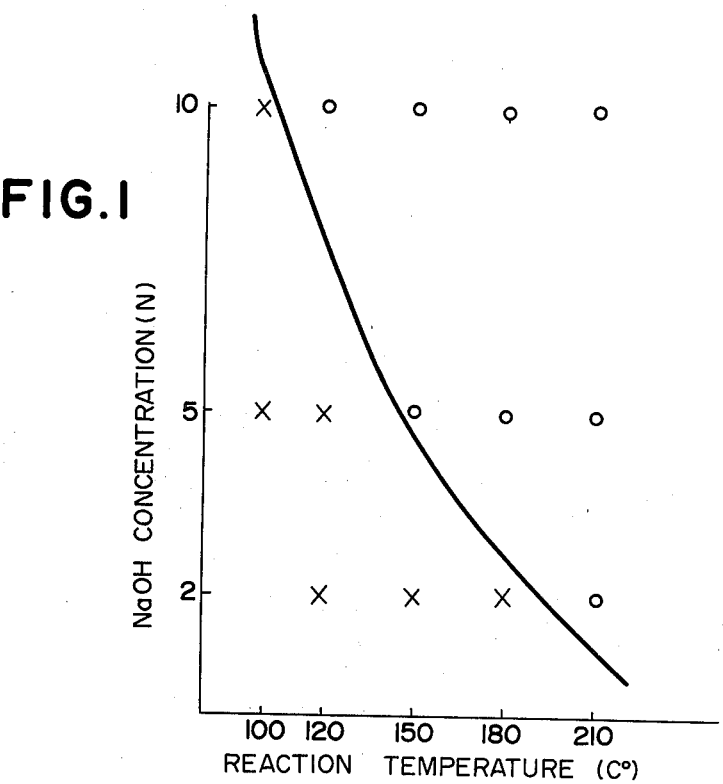
FIGS. 1 and 2 are graphs showing the results of experiments we have conducted to examine the dependence on the degree of magnetite-forming reactions according to the invention on hydrothermal treatment temperature and alkali concentration.

In principle, the process according to the invention achieves oxidation of magnetite to hematite by a hydrothermal reaction in a heated alkali. Magnetite is a compound comprising divalent iron ions and trivalent iron ions in the preparation of 1:2 as represented by the formula $Fe_3O_4$ (more particularly, $FeO.Fe_2O_3$) and having the spinel structure. Therefore, magnetite has the tendency of readily undergoing multiple substitution with various kinds of metal ions to give a group of compounds which are collectively called ferrite.

The starting material for the process according to the invention is not limited to pure magnetite and can arbitrarily be selected from various types of iron oxides, including crude and complex materials, of which principle component is magnetite. Some practical examples of such iron oxides are magnetite in a broad sense (expressed by $FeO_x \cdot Fe_2O_3$, where $0 < x \leqq 1$), mill scale, iron ores of which principal component is a magnetic iron ore, and black-colored and ferromagnetic precipitates formed by ferritication of heavy metal ions contained in industrial waste water.

Magnetite useful in the present invention can be prepared by various processes such as the reduction of $\alpha$-$Fe_2O_3$ obtained by dehydration by heating of goethite, oxidation of ferrous hydroxide formed by neutralizing a ferrous salt with alkali, a process of neutralizing an equimolar mix solution of $Fe^{2+}$ and $Fe^{3+}$ with a strong alkali to cause coprecipitation of $Fe^{2+}$ and $Fe^{3+}$ and then heating the coprecipitate to effect maturing, and a process of mildly heating a mix solution of ferrous hydroxide and ferric oxide under an alkaline condition. However, as mentioned hereinbefore, it is more profitable to prepare magnetite (in the case of using pure magnetite as the iron source for MIO) by a process we have devised, that is, hydrothermal treatment of an iron ore, or an iron compound, of which principal component is an oxide of trivalent iron together with another compound of divalent iron and/or a zero valence iron in an aqueous alkali solution.

Naturally-occurring ores of which principal component is a magnetic iron ore contains magnetite as their principal component, but they additionally contain some kinds of metal ions as impurity components and are obtained in a state involving quite unessential phases such as of clay. The present invention allows the use of a magnetic iron ore containing such impurities as the iron source for MIO and makes it possible to prepare MIO of sufficiently high purity even from such a low grade raw material.

The iron source in this process, either magnetite or a magnetite-containing material, is subjected to the hydrothermal treatment in powdered form, and MIO is obtained in the form of fine crystals. The particle size of the obtained MIO is generally proportional to the particle size of the material employed as the iron source and considerably influenced by several factors of the hydrothermal reaction condition such as the alkali concentration of the aqueous alkali solution, the rate of temperature rise during an initial stage of the hydorthermal treatment and the temperature at which the hydrothermal treatment is completed. Particularly, the particle size of MIO becomes larger as the alkali concentration is made higher and also becomes larger as the rate of temperature rise is made lower. Accordingly, by suitably combining these factors of the reaction condition it is possible to obtain MIO of a desired particle size within the range from about 1 micron to tens of microns.

Presumably, a hydrothermal reaction according to the invention proceeds through dissolution of magnetite and precipitation of MIO while the oxidizer in the heated alkali solution causes oxidation of divalent iron ions to trivalent iron ions. That is, there occurs reconstitution of crystal structure, whereby the tetragonal system of magnetite changes to the hexagonal system of MIO. As a general tendency during such reconstitution, impurities contained in the employed iron source dissolves out into the heated alkali solution with the result that MIO crystals are obtained in purified state.

The following examples 1-3 illustrate the present invention with respect to the use of crude magnetite-containing materials.

EXAMPLE 1

Used as the starting material was a magnetic iron ore (produced in Yaguki Mine, Japan; total Fe 63.53% (by weight), FeO 23.91%, $SiO_2$ 6.85%, $Al_2O_3$ 0.4%, Mg 0.047%, CaO 3.74%, S 0.97%, Mn 0.15%, Cu 0.04%, Zn 0.01%). In the form of particles which passed through 170-mesh sieve (ASTM standard), 13 g of this magnetic iron ore was charged into an autoclave provided with a stirrer together with 5.5 g of sodium nitrate, 70 g of sodium hydroxide and 100 ml of water. After replacement of air in the apparatus by nitrogen gas, heating of the reaction system in the autoclave was commenced at such a rate of temperature rise that the temperature reached 230° C. in 90 min. Thereafter the reaction system was maintained at this temperature for 1 hr and then subjected to natural cooling within the autoclave. Then a precipitate in the reaction system was separated from the mother liquor by filtration, washed with water and dried at 60° C. This precipitate weighed 12.1 g and, by X-ray diffraction analysis and electron micrograph observation, was identified as MIO crystals having a mean particle size of 15 microns. As the result of chemical analysis, the purity of the obtained MIO was 99.4%.

EXAMPLE 2

A ferrite type precipitate was formed by the following procedures as a simulation of recovery of zinc from a zinc-containing waste water. First, 43 g of ferrous sulfate hepta-hydrate was added to 500 ml of an aqueous solution of zinc sulfate (Zn concentraton in the solution was 2100 ppm). Then the solution was heated to 65°–70° C., and neutralized by the addition of sodium hydroxide with stirring. Thereafter air was blown into the solution continuously for 3 hr in order to achieve oxidation. During this oxidation procedure, the pH of the solution was regulated to 9–10. After completion of this oxidation procedure, the solution was filtered to separate a black-colored precipitate from the mother liquor. The Zn concentration in the resultant filtrate was confirmed to be only 0.1 ppm.

An entire quantity of the separated and yet wet precipitate was charged into an autoclave provided with a stirrer together with 1.4 g of sodium chlorate, 50 g of sodium hydroxide and 90 ml of water. After replacement of air in the apparatus by nitrogen gas, the reaction system was heated such that the temperature reached 220° C. in 90 min and thereafter maintained at this temperature for 1 hr, followed by natural cooling. Then, solid matter in the reaction system was separated from the alkaline solution by filtration, washed with water and dried. Obtained as the result was 12.9 g of MIO crystals having a mean particle size of 15 microns. The purity of this MIO was 99.2%, and the Zn content of this MIO was less than 0.5%.

EXAMPLE 3

Use was made of a mill scale ($Fe_3O_4$ 65.7% (by weight), FeO 34.1% Cr 0.109%, Ni O 0.033%) formed in the rolling stage of a blast furnace plant, in the form of particles that passed through 170-mesh sieve. Together with 7 g of sodium chlorate, 106 g of sodium hydroxide and 150 ml of water, 20 g of this mill scale was charged into an autoclave provided with a stirrer. Air in the apparatus was replaced by nitrogen gas, and then heating of the reaction system in the autoclave was commenced so as to raise the temperature to 210° C. in 90 min. The reaction system was maintained at this temperature for 2 hr and thereafter subjected to natural cooling. Obtained through subsequent separation by filtration, washing and drying were 21.1 g of 99.3% purity MIO crystals having a mean particle size of 15 microns.

To obtain MIO of very high purity by the process according to the invention, it is desirable to use pure magnetite as the iron source. Conventional processes for the preparation of magnetite were described hereinbefore. Among these processes, the reduction of $\alpha$-$Fe_2O_3$ is practiced mainly for forming an intermediate in the preparation of needle-shaped $Fe_2O_3$ for use in magnetic tapes or the like, and the heating of a coprecipitate of divalent and trivalent iron compounds is rarely put into industrial practice. Magnetite for pigments, and also suitable to the present invention, has been prepared mostly by the oxidation of ferrous hydroxide formed by an alkali treatment of an aqueous solution of a ferrous salt.

In the present invention it is not a requisite to prepare magnetite by a specific process. However, we have succeeded in preparing high purity magnetite by a novel process which allows the use of a cheap iron source, enables to greatly decrease the consumption of alkali and can be performed under a relatively mild reaction condition. It is very profitable to employ this process for the preparation of magnetite to be converted to MIO by the already described process according to the invention.

The novel process for the preparation of magnetite is based on our discovery that iron ore, which is tight in structure and seemingly low in reactivity, reacts with either a ferrous salt or metallic iron (iron powder) in a heated aqueous alkali solution to form magnetite. More particularly, this process is a hydrothermal treatment of an iron ore, or an iron oxide, of which principal component is an oxide of trivalent iron in an aqueous alkali solution together with a compound of divalent iron and/or zero valence iron, i.e. metallic iron. The hydrothermal treatment is performed at a temperature not lower than 90° C., preferably in the range from about 120° C. to about 230° C., usually in an autoclave.

Examples of raw materials containing an oxide of trivalent iron as their principal component are iron ores such as red iron ore (essentially hematite) and magnetic iron ore (essentially maghemite) and commercial iron oxides such as red iron oxide and $\gamma$-ferric oxide. Typical examples of iron compounds of divalent iron oxide are iron salts such as ferrous sulfate, ferrous chloride and ferrous nitrate, hydroxide of such salts and iron oxides. As zero valence iron or metallic iron, iron powder and reduced iron can be named by way of example. In the case of using metallic iron and an iron compound of divalent iron jointly, there is no particular limitation to the proportion of the former to the latter.

In a broad sense, this process has a resemblance to a known process (described in Japanese Patent Application Publication No. 48(1973)-27200) of preparing magnetite by heating a mix of a fine powder of ferric oxide, such as red iron oxide, and ferrous hydroxide to 50°-80° C. in an alkali solution. However, there is a fundamental difference between our process and the process of Japanese patent specification No. 48(1973)-27200. Our process is a hydrothermal treatment at a temperature not lower than 90° C. and preferably at 120°-230° C., whereas the heating according to the Japanese Patent is performed at 50°-80° C. and, hence, can hardly be regarded as a hydrothermal treatment. A high temperature condition in an alkali solution as employed in our process is necessary to force an iron ore which has a tight structure to undergo reaction. According to the Japanese Patent Specification, "when the reaction temperature exceeds 80° C., $Fe_2O_3$ coexists in the product", but by our process it is possible to obtain magnetite alone without experiencing coexistence of $Fe_2O_3$. The reason for the coexistence of $Fe_2O_3$ at above 80° C. in the process of the Japanese Patent is considered to be as follows. Since this process is a reaction in the atmospheric air and requires a long time stirring, ferrous hydroxide and/or fine particles of magnetite once formed will undergo oxidation during reaction. This phenomenon is liable to be accelerated as the temperature rises and results in the coexistence of $Fe_2O_3$. Therefore, the reaction temperature is maintained in a relatively low temperature range, 50°-80° C. In contrast, our process is a hydrothermal synthesis usually conducted in an autoclave, after replacement of air in the system by an inactive gas such as nitrogen, at a considerably high temperature (preferably at 120°-230° C.) and under a strongly alkaline condition (caustic alkali, preferably 2–15 N). Owing to these features, it is possible to obtain magnetite with high yield and with little tendency of undergoing oxidation.

The preparation of magnetite by our process is represented by the following equations by way of example.

(A) in the case of using a ferrous salt:

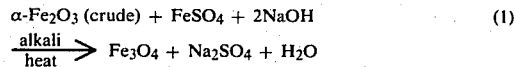
$$\alpha\text{-}Fe_2O_3 \text{ (crude)} + FeSO_4 + 2NaOH \qquad (1)$$
$$\xrightarrow[\text{heat}]{\text{alkali}} Fe_3O_4 + Na_2SO_4 + H_2O$$

(B) in the case of using metallic iron:

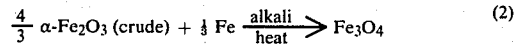
$$\tfrac{4}{3}\alpha\text{-}Fe_2O_3 \text{ (crude)} + \tfrac{1}{3} Fe \xrightarrow[\text{heat}]{\text{alkali}} Fe_3O_4 \qquad (2)$$

The preparation of MIO by a process according to the invention is represented by the following equation by way of example:

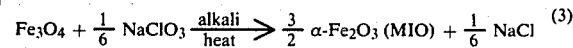
$$Fe_3O_4 + \tfrac{1}{6} NaClO_3 \xrightarrow[\text{heat}]{\text{alkali}} \tfrac{3}{2}\alpha\text{-}Fe_2O_3 \text{ (MIO)} + \tfrac{1}{6} NaCl \qquad (3)$$

For comparison, conventional processes for the preparation of MIO using ferrous sulfate as the iron source, typified by the process of Japanese Patent Application Publication No. 48(1973)-29718, are represented by the following equations:

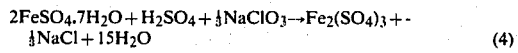
$$2FeSO_4 \cdot 7H_2O + H_2SO_4 + \tfrac{1}{3}NaClO_3 \rightarrow Fe_2(SO_4)_3 + \tfrac{1}{3}NaCl + 15H_2O \qquad (4)$$

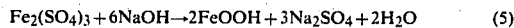
$$Fe_2(SO_4)_3 + 6NaOH \rightarrow 2FeOOH + 3Na_2SO_4 + 2H_2O \qquad (5)$$

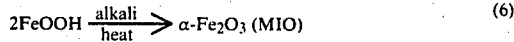
$$2FeOOH \xrightarrow[\text{heat}]{\text{alkali}} \alpha\text{-}Fe_2O_3 \text{ (MIO)} \qquad (6)$$

The following Table presents theoretical units of materials and by-products for these novel and conventional processes.

| Materials and By-products | conventional Process Eq. (4) – (6) | Process of the Invention | |
|---|---|---|---|
| | | Use of FeSO$_4$ Eq. (1) + (3) | Use of Iron Eq. (2) + (3) |
| Iron Ore (96%) | — | 0.69 | 0.93 |
| Iron Powder (96%) | — | — | 0.081 |

-continued

| Materials and By-products | conventional Process Eq. (4) — (6) | Process of the Invention | |
|---|---|---|---|
| | | Use of FeSO$_4$ Eq. (1) + (3) | Use of Iron Eq. (2) + (3) |
| FeSO$_4$ . 7H$_2$O (96%) | 3.63 | 1.21 | — |
| NaOH (100%) | 1.50 | 0.33 | 0 |
| NaClO$_3$ (99%) | 0.22 | 0.075 | 0.075 |
| H$_2$SO$_4$ (98%) | 0.63 | — | — |
| Na$_2$SO$_4$ . 10H$_2$O | 6.05 | 1.35 | — |
| NaCl | 0.12 | 0.041 | 0.041 |

Theoretical Unit : kg/kg (MIO)

As can be seen in this Table, when magnetite is prepared by our novel process, the preparation of MIO by the present invention is advantageous over the conventional process in the following points.

(1) The consumption of alkali becomes 1/4.5 or zero.

(2) The consumption of oxidizer becomes ⅓.

(3) The amount of sodium sulfate as by-product becomes 1/4.5 or zero, and the amount of sodium chloride also as by-product becomes ⅓. Such a remarkable decrease in the quantity of alkali brings about a considerable reduction of the material cost. Moreover, the decrease in the quantity of alkali has another favorable effect on the process. That is, the slurry concentration (the proportion of the iron source to the alkali solution) can be made higher. Generally in the case of alkali neutralization of either a ferrous salt or a ferric salt, the viscosity of the reaction solution increases progressively as the concentration of the iron salt is increased, so that stirring becomes impossible at a certain concentration. In the process of the invention, the use of a greatly decreased quantity of alkali means a considerable lowering of the viscosity of the alkali solution, and accordingly it becomes possible to increase the concentration of the iron salt, i.e. slurry concentration. Therefore, this process can be performed with an increased volumetric efficiency. The decreased quantities of the by-product salts also enable to increase the slurry concentration because restriction on the quantities of the raw materials imposed by the solubilities of the by-products is lessened and, therefore, contribute to an increase in the volumetric efficiency.

In the case of using an iron ore as the iron source for the preparation of magnetite, and then MIO, by a process of the invention, there is no need of paying special attention to the purity of the iron ore. It was confirmed that impurities (SiO$_2$, Al$_2$O$_3$, etc.) contained in iron ores useful in the present invention almost entirely dissolve out into the heated alkali solution during the hydrothermal treatment for the preparation of magnetite, and small quantities of impurities possibly retained in the prepared magnetite are removed during the hydrothermal treatment for the preparation of MIO, so that the impurities hardly enter the synthesized MIO crystals. Therefore, impurities as experienced in usual iron ores for usual industrial use do not offer a problem to the present invention.

An iron ore or an iron oxide employed as the iron source for the preparation of magnetite is pulverized into particles of 35 to 400 mesh, and more preferably 60 to 200 mesh.

In the case of using a compound of divalent iron, the mole ratio of this iron compound to ferric oxide in the iron source material (Fe(OH)$_2$/Fe$_2$O$_3$) is made to fall within the range from 0.9 to 1.3, and more preferably from 1.0 to 1.2. In the case of using a metallic iron, the mole ratio of the metallic iron to ferric oxide (Fe/Fe$_2$O$_3$) in the iron source material is made to fall within the range from 0.2 to 0.5, and more preferably from 0.25 to 0.4.

In the preparation of magnetite by our process, the temperature of the hydrothermal treatment and the alkali concentration of the alkali solution affect both the rate of reaction and the particle size of the prepared magnetite. To realize a practical rate of reaction, both the treatment temperature and the alkali concentration should be made adequately high. The particle size of magnetite becomes larger as the treatment temperature is made higher and, more significantly, as the alkali concentration is made higher. However, the particle size begins to become smaller when the treatment temperature and/or alkali concentration are made excessively high. Therefore, the temperature of the hydrothermal treatment is determined within the range from 90° C. to about 400° C., and more preferably from about 120° C. to about 230° C., and the alkali concentration is made to fall within the range from 1 to 20 N as NaOH, and more preferably from 2 to 15 N. By suitably determining these two factors respectively within these ranges, it is possible to control the particle size of magnetite over a fairly wide range. Also, the particle size of magnetite becomes smaller as the rate of temperature rise is made higher.

The following experiments demonstrate the effects of the hydrothermal treatment temperature and the alkali concentration in our process of preparing magnetite on the degree of reaction of an iron ore or an iron oxide employed as the iron source.

EXPERIMENT I

An iron ore (produced in Itabira Mine of Brazil; Fe 66.9% (by weight), SiO$_2$ 1.75%, Al$_2$O$_3$ 1.11%, S 0.005%, P 0.034%) was pulverized into particles of 170 to 400 mesh, and 10 g of the powdered iron ore was charged into an autoclave provided with a stirrer together with 20.5 ml of a ferrous chloride solution (care was taken to maintain the divalent condition of iron by adding small quantities of iron powder and hydrochloric acid; the concentration was 3.25 M/l), water and sodium hydroxide in a quantity appropriate to realize an alkali concentration variably determined within the range of 2–10 N. After replacement of air in the apparatus by nitrogen gas, heating of the reaction system was commenced such that a variably predetermined temperature was reached after 90 min from the start of the heating. The reaction system was maintained at this temperature for 2 hr and thereafter subjected to natural cooling. Then the product was separated from the mother liquor by filtration, washed with water, dried at 60° C. and thereafter subjected to X-ray diffraction analysis and electron micrograph observation. FIG. 1 shows the effects of the reaction temperature and the alkali concentration on the degree of reaction of the iron ore examined by this experiment. In FIG. 1, the circular marks represent reaction conditions where magnetite alone was obtained, and the cross marks represent reaction conditions where unreacted iron ore and other iron oxides coexisted in the obtained magnetite.

EXPERIMENT II

Figure 2:
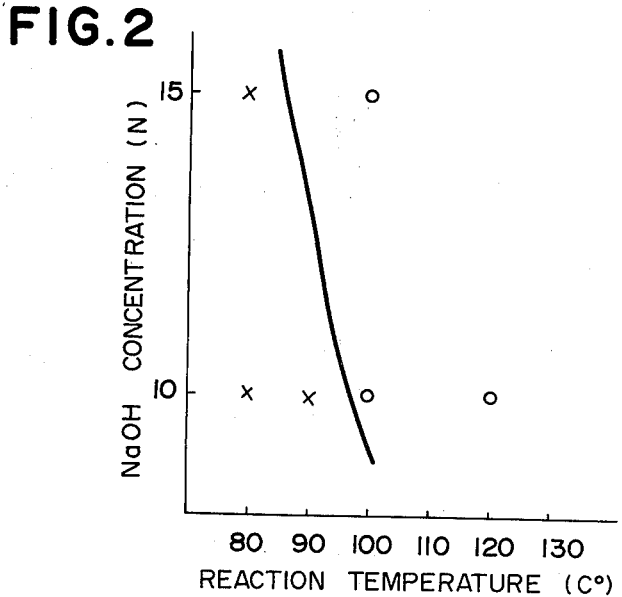

This experiment was generally similar to Experiment I, but as a sole difference a commercial red iron oxide (Fe$_2$O$_3$ 95 Wt%) was used in place of the iron ore in Experiment I. FIG. 2 shows the result of this experiment. Besides, it was confirmed by supplemental experiments that magnetite alone can be obtained even under reaction conditions represented by the cross marks in FIG. 2 by prolongation of the reaction time to 7 hr from 2 hr employed in Experiments I and II.

The present invention will further be illustrated by the following examples including the preparation of magnetite.

EXAMPLE 4

Figure 3:
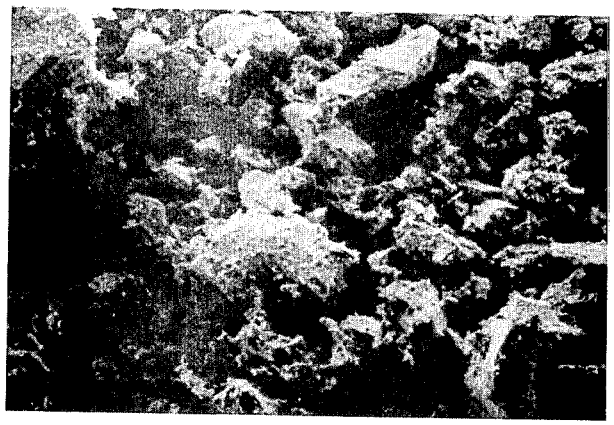
FIG. 3 is an iron ore powder used as the starting material in an example of the present invention.
Figure 4:
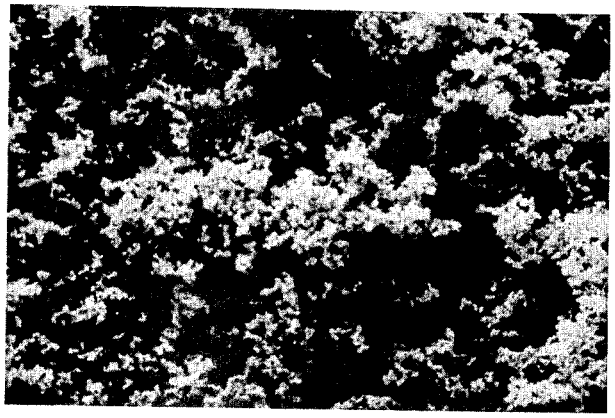
FIG. 4 is an electron micrograph of magnetite particles obtained in the same example.

The iron ore (Itabirite of Brazil) used in Experiment I was pulverized into particles which passed through 80-mesh sieve (ASTM standard), and 70 g of the iron ore particles were charged into an autoclave provided with a stirrer together with 139 ml of a ferrous chloride solution (the concentration was 3.32 M/l, care was taken to maintain the divalent condition of iron by adding small quantities of iron powder and hydrochloric acid), 97.5 g of sodium hydroxide and 100 ml of water. Air in the apparatus was replaced by nitrogen gas, and then heating of the reaction system was commenced so as to raise the temperature to 180° C. in 90 min. The reaction system was maintained at this temperature for 1 hr and thereafter subjected to natural cooling. Obtained through subsequent filtration for recovery of precipitate, washing with water and drying at 60° C. were 103 g of black-colored fine crystals. By X-ray diffraction analysis and electron micrograph observation the crystals were identified as of isomeric system, and also it was confirmed that the iron ore had completely been converted to magnetite. FIG. 3 is an electron micrograph of the iron particles used in this example, and FIG. 4 is an electron micrograph of magnetite prepared in this example.

To prepare MIO, 12 g of magnetite obtained by the above process was charged into an autoclave together with 2 g of sodium chlorate, 43 g of sodium hydroxide and 100 ml of water (so that NaOH concentration of a resultant solution was 10 N). After replacement of air in the apparatus by nitrogen gas, the reaction system was heated to 210° C. in 90 min and thereafter maintained at this temperature for 1 hr, followed by natural cooling within the autoclave. Thereafter solid matter in the reaction system was separated from the alkaline solution by filtration, washed with water and dried at 60° C., with the result that 12.1 g of black-colored fine crystals of isomeric system were obtained. By X-ray diffraction analysis and electron micrograph observation, these crystals were identified as hexagonal plate-like α-Fe$_2$O$_3$ (MIO) having a mean particle size of 10 microns. As the result of chemical analysis, the purity (Fe$_2$O$_3$) of this MIO was 99.5%.

This process of preparing MIO was repeated with a sole change that the NaOH concentration of the alkali solution was made to be 14 N. Obtained as the result were 12.1 g of MIO crystals having a mean particle size of 20 microns. In this case the purity of MIO was 99.7%.

Another run of the MIO preparation process was carried out by using 6.6 g of sodium nitrate in place of 2 g of sodium chlorate in the initial run and decreasing the quantity of sodium hydroxide to 42.4 g (from 43 g in the initial run). MIO crystals obtained by this run weighed 11.8 g, was 99.6% in purity and had a mean particle size of 10 microns.

EXAMPLE 5

Figure 5:
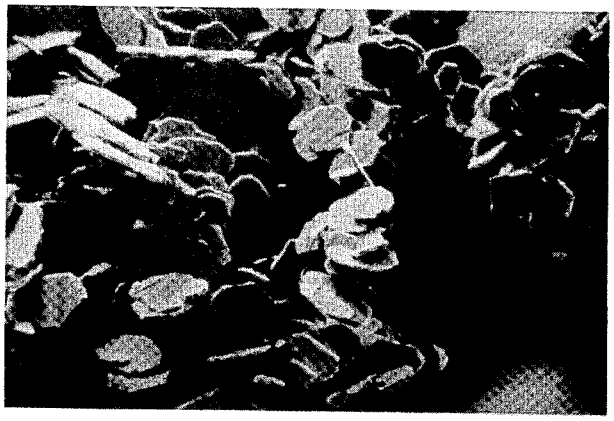
FIG. 5 is an electron micrograph of MIO particles prepared in another example of the present invention.

An iron ore (Itabirite of Brazil; Fe 63.5% (by weight), SiO$_2$ 6.0%, Al$_2$O$_3$ 1.5%, P 0.07%, S 0.05%) was pulverized to obtain particles that passed through 80-mesh sieve, and 8.7 g of the iron ore particles were charged into an autoclave provided with a stirrer together with 18.7 ml of a ferrous chloride solution (concentration: 3.32 M/l), 48 g of sodium hydroxide and 80 ml of water. After replacement of air in the apparatus by nitrogen gas, the reaction system was heated to 180° C. in 90 min and thereafter maintained at this temperature for 1 hr, followed by natural cooling. When the temperature lowered to 90° C., the autoclave was once opened to add 2.5 g of sodium chlorate to the reaction system. Then the reaction system in the autoclave was again heated to 210° C. and maintaining at this temperature for 1 hr, followed by natural cooling to room temperature within the autoclave. Through subsequent separation by filtration, washing and drying, 13.5 g of fine crystals were obtained. This product was confirmed to be MIO of 99.4% purity, and mean particle size of the fine crystals was 12 microns. FIG. 5 is an electron micrograph of MIO particles obtained in this example.

EXAMPLE 6

Use was made of the iron ore in Example 4. Charged into an autoclave provided with a stirrer were 10 g of the iron ore particles, 5.3 g of commercial ferrous oxide (FeO 85%), 70.7 g of sodium hydroxide and 100 ml of water. After replacement of air in the apparatus by nitrogen gas, the reaction system was heated to 270° C. in 100 min and maintained at this temperature for 1 hr, followed by natural cooling. This process gave 14.6 g of magnetite in the form of fine particles.

To prepare MIO, 14.6 g of magnetic obtained by the above process was charged into the autoclave together with 2 g of sodium chlorate, 44 g of sodium hydroxide and 100 ml of water. After introduction of nitrogen gas into the autoclave, the reaction system was heated to 210° C. and maintained at this temperature for 2 hr. Through subsequent natural cooling, filtration, washing and drying, 14.7 g of MIO was obtained in the form of crystalline particles having a mean particle size of 20 microns. The purity of this MIO was 99.6%.

EXAMPLE 7

In this example, 9.6 g of commercial red iron oxide (Fe$_2$O$_3$ 95%) was charged into an autoclave provided with a stirrer together with 49.9 ml of a ferrous sulfate solution (concentration: 1.32 M/l), 47.7 g of sodium hydroxide and 50 ml of water. After replacement of air in the apparatus by nitrogen gas, heating of the reaction system was started such that the temperature reached 120° C. after 80 min from the start of heating. The reaction system was maintained at this temperature for 1 hr and then subjected to natural cooling. Obtained through subsequent filtration, washing and drying was 14.5 g of magnetite in the form of black-colored fine crystals of cubic system.

Next, 14.5 g of magnetite thus obtained was charged into the autoclave together with 2 g of sodium chlorate, 44 g of sodium hydroxide and 100 ml of water. After introduction of air into the autoclave, the reaction system was heated to 190° C. and maintained at this temperature for 1 hr, followed by natural cooling. This process gave 14.8 g of MIO in the form of crystalline particles having a mean particle size of 15 microns. The purity of this MIO was 99.7%.

EXAMPLE 8

In this example, 9.6 g of γ-ferric oxide ($Fe_2O_3$ 99 Wt%) for use in magnetic recording media was charged into an autoclave provided with a stirrer together with 16.6 ml of a ferrous chloride solution (concentration: 3.97 M/l), 48 g of sodium hydroxide and 85 ml of water. In nitrogen gas atmosphere the reaction system in the autoclave was maintained at 150° C. for 1 hr, followed by natural cooling, recovery of solid matter by filtration, washing and drying. This process gave 13.7 g of magnetite particles.

Next, 13.7 g of magnetite thus prepared was charged into the autoclave together with 7 g of sodium nitrate, 60 g of sodium hydroxide and 100 ml of water. In nitrogen gas atmosphere the reaction system was maintained at 210° C. for 1 hr, and then subjected to natural cooling. Through subsequent filtration, washing and drying, 14.0 g of MIO was obtained in the form of crystalline particles having a mean particle size of 20 microns. The purity of this MIO was 99.8%.

EXAMPLE 9

The iron ore (Itabirite) described in Example 4 was used in this case in the form of 65-30 mesh particles. Charged into an autoclave provided with a stirrer were 10 g of the iron ore particles, 24.1 ml of a ferrous chloride solution (concentration: 3.97 M/l), 76 g of sodium hydroxide and 75 ml of water. After replacement of air in the apparatus by nitrogen gas, the reaction system was heated to 180° C. in 90 min and thereafter maintained at this temperature for 1 hr. Obtained through subsequent natural cooling of the reaction system in the autoclave, filtration, washing and drying was 15.2 g of magnetite alone. This magnetite was in the form of black-colored fine particles and suitable as the starting material in the preparation of MIO by a process according to the invention. This example demonstrates that even relatively coarse grains of iron ore can completely be converted to magnetite by a process we have devised.

EXAMPLE 10

The iron ore (Itabirite) particles used in Example 4 was used also in this example. To prepare magnetite, 10 g of the iron ore particles were charged into an autoclave provided with a stirrer together with 1.0 g of iron powder (passed through 200-mesh sieve), 69 g of sodium hydroxide and 150 ml of water. After introduction of nitrogen gas into the autoclave, the reaction system was heated to 180° C. in 90 min and maintained at this temperature for 1 hr, followed by natural cooling. Through the subsequent procedures mentioned in the foregoing examples, 12 g of fine, black-colored crystals of isomeric system were obtained. It was confirmed by X-ray diffraction analysis and electron micrograph observation that the crystals were entirely magnetite.

Then, MIO was prepared by subjecting 12 g of magnetite prepared in this example, 1.7 g of sodium chlorate, 44 g of sodium hydroxide and 100 ml of water to a hydrothermal treatment generally similar to that in Example 4 except that the treatment temperature was raised to 200° C. MIO obtained in this case was of 99.5% purity, weighed 12.2 g and had a mean particle size of 15 microns.

The magnetite-preparing process of this example was repeated with some modification. In this case, use was made of finer particles of the iron ore, 170-400 mesh particles, and a more concentrated alkali solution given by 76 g of sodium hydroxide and 100 ml of water, and the reaction system in the autoclave was heated to 200° C. in 90 min and thereafter maintained at 200° C. for 1.5 hr. As the result 10.5 g of fine and black-colored crystals were obtained, and it was confirmed by X-ray diffraction analysis and electron micrograph observation that the iron ore particles had entirely been converted to magnetite.

EXAMPLE 11

Charged into an autoclave provided with a stirrer were 9.6 g of commercial red iron oxide ($Fe_2O_3$ 95 Wt%), 1.0 g of commercial iron powder, 60 g of sodium hydroxide and 100 ml of wate. After replacement of air in the apparatus by nitrogen gas, the reaction system was heated to 180° C. and maintained at this temperature for 1 hr. Thereafter, natural cooling, filtration, washing and drying were performed in the same way as in the foregoing example. The product of this process was 10.4 g of high purity magnetite in the form of fine and black-colored crystals. It was experimentally confirmed that this magnetite was suitable for use in the preparation of MIO by a process according to the invention.

EXAMPLE 12

This example utilized 10 g of the iron ore particles mentioned in Example 4, 0.4 g of commercial iron powder, 3 g of commercial ferrous oxide, 76 g of sodium hydroxide and 100 ml of water as starting materials for the preparation of magnetite. These materials were charged into an autoclave provided with a stirrer, and air in the apparatus was replaced by nitrogen gas. Then the reaction system was heated to 250° C. and maintained at this temperature for 1 hr. Through subsequent natural cooling in the autoclave, filtration, washing and drying, 10.5 g of magnetite was obtained in the form of black-colored fine crystals. It was experimentally confirmed that this magnetite could be converted entirely to a high purity MIO powder by a process according to the invention.

What is claimed is:

1. A process of preparing hexagonal plate-like crystals of α-$Fe_2O_3$, comprising mixing a first material of which a principal component thereof is magnetite, an aqueous alkali solution having an alkali concentration in the range of 1 to 20 N, and an oxidizer, in a closed vessel and hydrothermally treating the resultant mixture at a temperature of from about 100° to 400° C. for a time sufficient to effect formation of hexagonal plate-like crystals of α-$Fe_2O_3$.

2. A process according to claim 1, wherein said aqueous alkali solution is an aqueous solution of an alkali metal hydroxide.

3. A process according to claim 2, wherein said concentration is in the range from 2 to 15 N.

4. A process according to claim 1, wherein said hydrothermal treatment is performed at a temperature in the range from about 120° C. to about 300° C.

5. A process according to claim 1, wherein said oxidizer is selected from the group consisting of chlorates, nitrates and perchlorates.

6. A process according to claim 5, wherein said oxidizer is sodium chlorate, the mole ratio of said oxidizer to magnetite contained in said first material is in the range from 0.16 to 0.8.

7. A process according to claim 1, wherein said oxidizer is selected from the group consisting of air, oxygen and hydrogen peroxide.

8. A process according to claim 1, wherein said first material is an iron ore in a pulverized state.

9. A process according to claim 1, wherein said first material is a ferrite in a pulverized state.

10. A process according to claim 1, wherein said first material is a mill scale in a pulverized state.

11. A process according to claim 1, wherein said first material consists essentially of magnetite.

12. A process according to claim 11, wherein said first material is prepared by subjecting powdery second material of which principal component is an oxide of trivalent iron to a hydrothermal treatment in an aqueous alkali solution at a temperature not lower than 90° C. together with a compound of divalent iron.

13. A process according to claim 12, wherein the mole ratio of said compound to said oxide of trivalent iron contained in said second material is in the range from 0.9 to 1.3.

14. A process according to claim 13, wherein said compound is selected from the group consisting of ferrous sulfate, ferrous chloride, ferrous nitrate, ferrous hydroxide and ferrous oxide.

15. A process according to claim 11, wherein said first material is prepared by subjecting a powdery second material of which principal component is an oxide of trivalent iron to a hydrothermal treatment in an aqueous alkali solution at a temperature not lower than 90° C. together with a metallic iron.

16. A process according to claim 15, wherein the mole ratio of said metallic iron to said oxide of trivalent iron contained in said second material is in the range from 0.2 to 0.5.

17. A process according to claims 12 or 15, wherein said aqueous alkali solution in the preparation of said first material is an aqueous solution of an alkali metal hydroxide and has a concentration in the range from 2 to 15 N.

18. A process according to claim 17, wherein said hydrothermal treatment in the preparation of said first material is performed in a closed vessel at a temperature in the range from about 120° C. to about 230° C.

19. A process according to claim 18, wherein said second material is an iron ore.

20. A process according to claim 18, wherein said second material is a red iron oxide.

21. A process according to claim 18, wherein said second material is $\gamma$-ferric oxide.

22. A process according to claim 11, wherein said first material is prepared by subjecting a powdery second material of which principal component is an oxide of trivalent iron to a hydrothermal treatment in an aqueous alkali solution together with a compound of a divalent iron and a metallic iron.

* * * * *